United States Patent [19]

Fujita

[11] Patent Number: 4,606,571

[45] Date of Patent: Aug. 19, 1986

[54] ADJUSTABLE FRONT WINDSHIELD STRUCTURE OF OPEN-TOP VEHICLE

[75] Inventor: Haruyasu Fujita, Tokyo, Japan

[73] Assignee: Honda Giken Kogyo Kabushiki Kaisha, Tokyo, Japan

[21] Appl. No.: 601,328

[22] Filed: Apr. 17, 1984

[30] Foreign Application Priority Data

| Apr. 20, 1983 | [JP] | Japan | 58-59094[U] |
| Jun. 29, 1983 | [JP] | Japan | 58-117733 |
| Jun. 29, 1983 | [JP] | Japan | 58-117734 |
| Jun. 29, 1983 | [JP] | Japan | 58-117735 |

[51] Int. Cl.⁴ .............................................. B60J 1/06
[52] U.S. Cl. ..................................... 296/89; 296/78.1
[58] Field of Search ............... 296/84 R, 78.1, 84 N, 296/89, 90; 49/325, 357

[56] References Cited

U.S. PATENT DOCUMENTS

| 1,392,880 | 10/1921 | Simpson | 296/89 |
| 3,740,093 | 6/1973 | Platzer | 49/357 |

FOREIGN PATENT DOCUMENTS

| 847859 | 6/1952 | Fed. Rep. of Germany | 296/78.1 |
| 735771 | 10/1955 | Fed. Rep. of Germany | 296/78.1 |
| 254850 | 7/1926 | United Kingdom | 296/78.1 |
| 733208 | 7/1955 | United Kingdom | 296/78.1 |

Primary Examiner—Robert R. Song
Attorney, Agent, or Firm—Birch, Stewart, Kolasch & Birch

[57] ABSTRACT

An adjustable front windshield structure for an open-top vehicle, comprising a front structural member forming part of the vehicle body structure, a front windshield panel upstanding from and vertically movable with respect to the structural member, a pair of guide members fast on the front structural member and each having a vertically extending portion, slide members respectively engaging the guide members and each movable at least in part along the vertically extending portion of each guide member, and drive means operative to drive the slide members for movement along the guide members, respectively. The slide members are securely connected to the windshield panel, which is thus movable upwardly or downwardly with the slide members along the respective vertically extending portions of the guide members.

18 Claims, 12 Drawing Figures

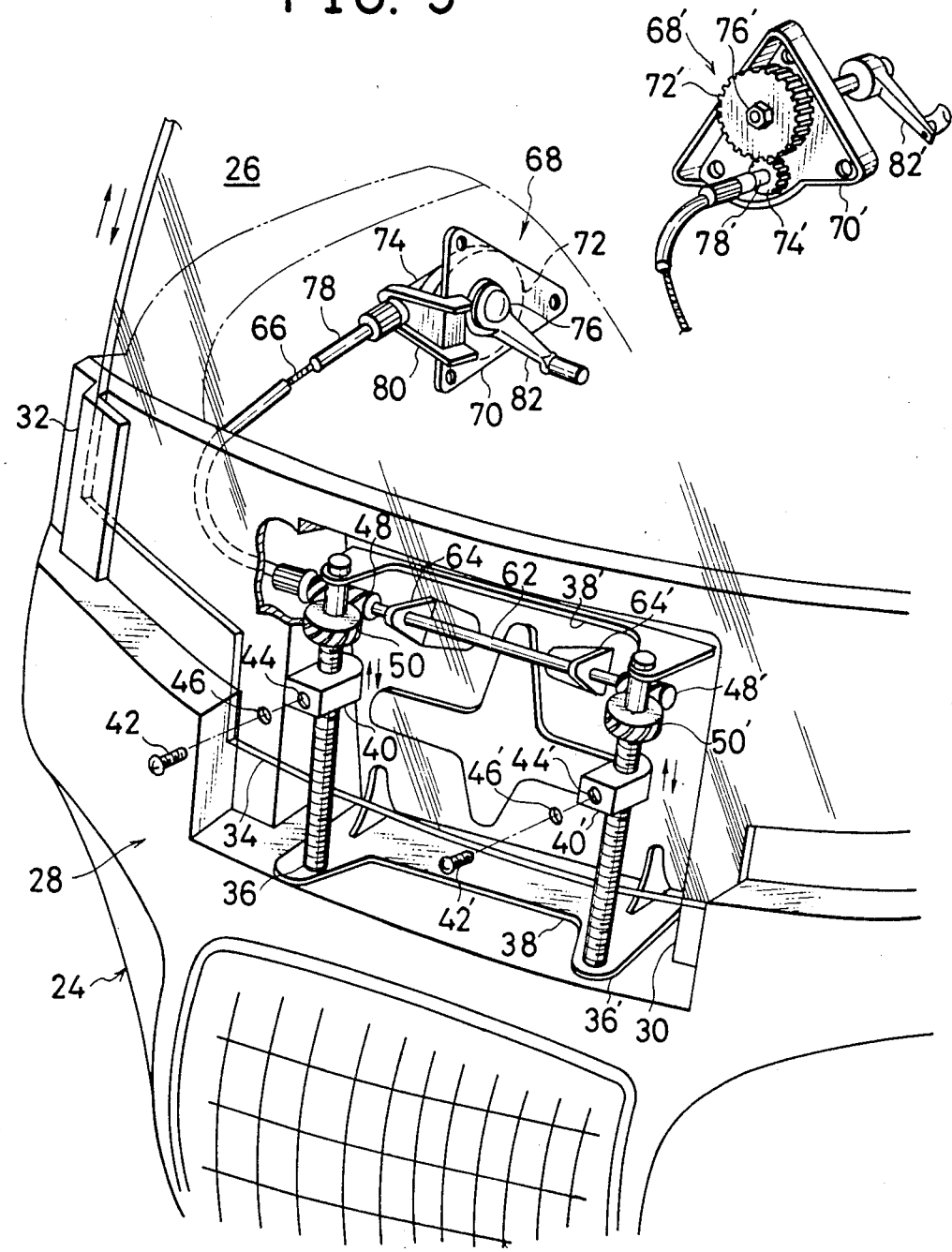

ADJUSTABLE FRONT WINDSHIELD STRUCTURE OF OPEN-TOP VEHICLE

FIELD OF THE INVENTION

The present invention relates to an adjustable front windshield structure for an open-top vehicle. An open-top vehicle to incorporate an adjustable front windshield structure according to the present invention is of the type having a front windshield and no upper covering over at least the driver's seat of the vehicle and may be a roofless vehicle such as a motorcycle or scooter with two or three road wheels or a power-driven bicycle or an automotive vehicle or truck such as an open car or a convertible with a collapsible hood or roof structure.

BACKGROUND OF THE INVENTION

A certain type of, for example, two-wheel motorcycle has a front windshield fitted to the fairing or the front cowl of the body structure of the motorcycle through means to adjust the vertical position of the windshield with respect to the fairing or front cowl. The height of the windshield of a motorcycle of this type can thus be adjusted depending upon the driver's preference and/or physical build and/or to achieve the best frontal sight through the windshield.

The adjust means provided for the windshield of such an open-top vehicle includes guide members attached to or integral with the body structure of the motorcycle and formed with grooves respectively extending along the right and left vertical side edge portions of the windshield panel. The vertical side edge portions of the windshield panel are slidably received in the grooves in these guide members and are securely fitted to the guide members by suitable fastening means such as set screws. To adjust the vertical position of the windshield panel with respect to the fairing or front cowl of the motorcycle, the set screws are first loosened from the windshield panel to permit the windshield panel to move upwardly or downwardly along the right and left guide members. After the windshield panel is manually moved to the desired vertical position with respect to the fairing or front cowl, the set screws are tightened to the windshield panel so that the windshield panel is held in the particular vertical position on the fairing or front cowl. Drivers of motorcycles provided with the adjust means of this nature are apt to spare themselves in managing to adjust the heights of the windshield panels in these manners and to leave the panels in positions which do not suite their preferences and/or physical builds.

The guide members and set screws forming part of the above described prior-art adjust means are covered or otherwise concealed with decorative members such as garnish plates attached to the fairing or front cowl. Such decorative members must be detached from and re-attached to the body structure of the motorcycle each time the windshield panel is to be position adjusted with respect to the fairing or front cowl. This results in added intricacy of the procedures to be taken for the position adjustment of the windshield panel.

These drawbacks of the conventional adjustable front windshield structure of a two-wheel motorcycle are encountered not only in two-wheel or three-wheel motorcycles but also in open-top vehicles of any other types insofar as the vehicles are provided with adjustable front windshield structures.

SUMMARY OF THE INVENTION

It is, accordingly, a prime object of the present invention to provide, in an open-top vehicle of any type, an adjustable front windshield structure which features a windshield panel supported on a front structural member of the vehicle body structure in such a manner that the windshield panel can be easily and readily adjusted for desired vertical position with respect to the structural member either manually or by the aid of suitable powered drive means.

In accordance with the present invention, such an object is accomplished basically in an adjustable front windshield structure for an open-top vehicle, comprising a front structural member which forms part of the body structure of the open-top vehicle, a front windshield panel upstanding from the front structural member and vertically movable with respect to the front structural member, guide means to guide the vertical movement of the windshield panel with respect to the front structural member, a pair of guide members fast on the front structural member and each having a vertically extending portion, slide members respectively engaging the guide members and each movable at least in part along the vertically extending portion of each of the guide members, drive means operative to drive the slide members for movement along the guide members, respectively, and fastening means securely connecting the slide members to the windshield panel so that the windshield panel is movable with the slide members along the respective vertically extending portions of the guide members.

BRIEF DESCRIPTION OF THE DRAWINGS

The features and advantages of an adjustable front windshield structure according to the present invention will be more clearly appreciated from the following description taken in conjunction with the accompanying drawings in which like reference numerals designate similar or corresponding units, members and elements and in which:

FIG. 5 is a view similar to FIG. 3 but shows a second preferred embodiment of an adjustable front windshield structure according to the present invention as also applied to the two-wheel motorcycle illustrated in FIGS. 1 and 2;

FIG. 6 is a fragmentary perspective view showing an alternative example of a manually-operated drive unit which forms part of the windshield structure illustrated in FIG. 5;

DESCRIPTION OF THE PREFERRED EMBODIMENTS

Figure 1:
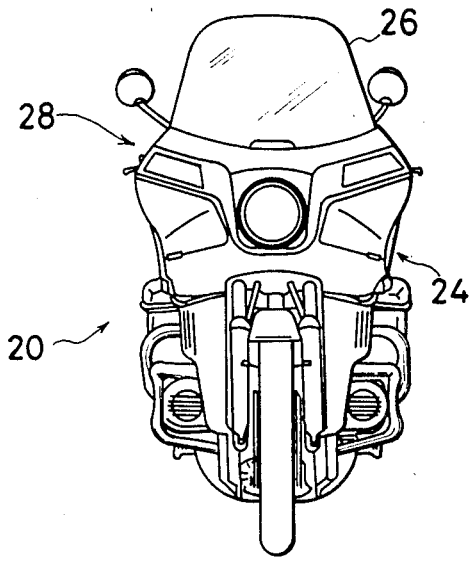
FIG. 1 is a front elevation view showing a two-wheel motorcycle into which an adjustable front windshield structure according to the present invention may be incorporated.
Figure 2:
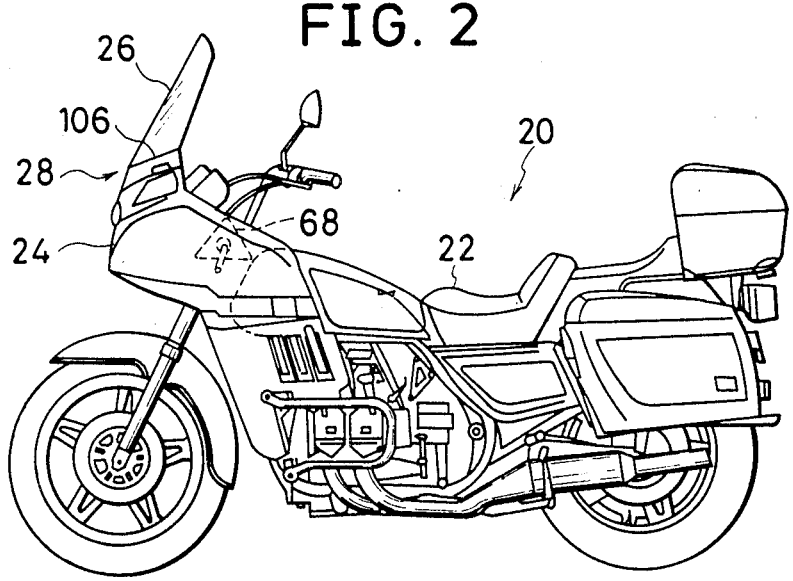
FIG. 2 is a side elevation view of the motorcycle shown in FIG. 1.

Description will be hereinafter made with reference to the drawings in regard to the various preferred embodiments of an adjustable front windshield structure according to the present invention. While an adjustable front windshield structure according to the present invention may be embodied in an open-top vehicle of any of the types specified at the outset of the description, the present invention will be hereinafter described as being applied to a motorcycle with two road wheels or a motor scooter with three wheels consisting of, a single front road wheel and two rear road wheels. FIGS. 1 and 2 of the drawings show an example of a two-wheel motorcycle which is designated in its entirety by reference numeral 20.

As shown in FIGS. 1 and 2, the two-wheel motorcycle 20 includes a driver's seat 22 and a front structural member constituted by a fairing or a front cowl 24 which forms part of the body structure of the motorcycle 20 and which is located in front of the driver's seat 22. The front cowl 24 has fitted thereto a headlight located in front of the cowl as shown. The motorcycle 20 further comprises a front windshield panel 26 upstanding from the front cowl 24. The construction of a motorcycle of the type herein shown being per se well known in the art and being rather immaterial to the understanding of the gist of the present invention, description regarding further details of the construction of the motorcycle 20 will not be herein incorporated.

Figure 3:
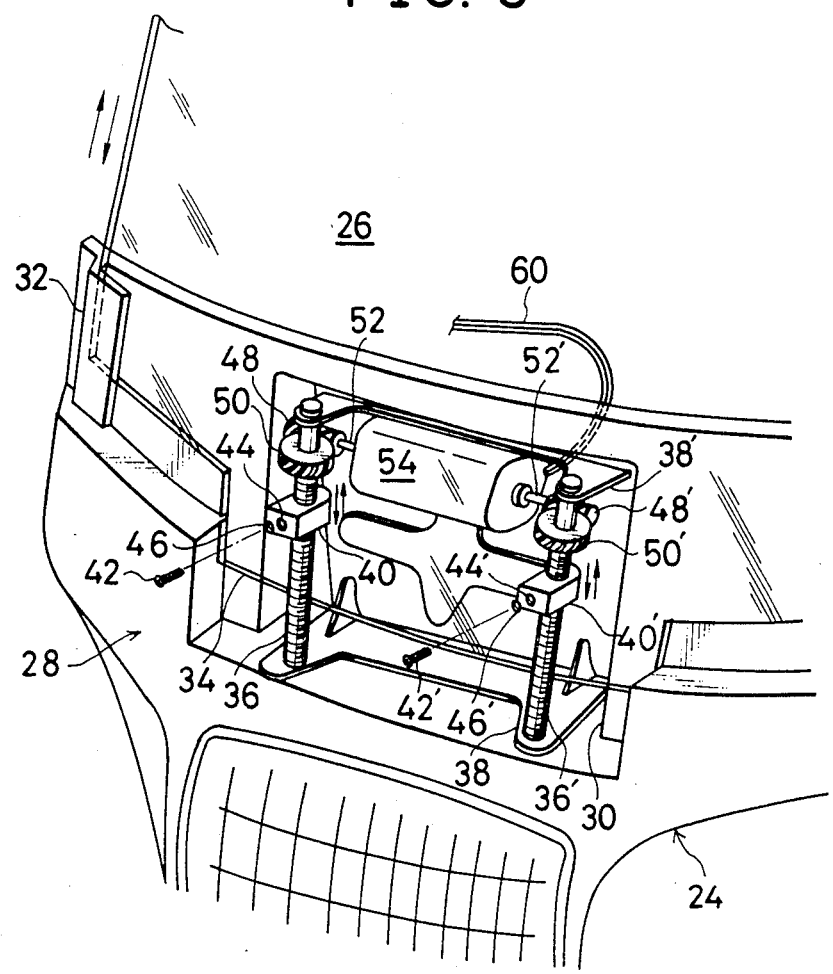
FIG. 3 is a fragmentary perspective view showing, to an enlarged scale, a first preferred embodiment of an adjustable front windshield structure according to the present invention as applied to the two-wheel motorcycle illustrated in FIGS. 1 and 2.

The fairing or front cowl 24 and the front windshield panel 26 of the motorcycle 20 as above described forms part of an adjustable front windshield structure which is indicated generally at 28 in FIGS. 1 and 2. As illustrated to an enlarged scale in FIG. 3 of the drawings, the adjustable front windshield structure 28 comprises a laterally middle upper end portion of the front cowl 24 formed with a forwardly open, generally rectangular concavity 30. The adjustable front windshield structure 28 further comprises a pair of guide members 32 attached to or integral with a front wall portion of the front cowl 24 and spaced apart from each other laterally of the front cowl 24 although only one of such members is seen in FIG. 3. The guide members 32 on the front cowl 24 extend vertically along opposite side edge portions, respectively, of the windshield panel 26 and form vertical grooves which are open upwardly and further toward each other laterally of the front cowl 24. The opposite side edge portions of the windshield panel 26 are slidably received in these grooves to permit the windshield panel 26 to move upwardly or downwardly with respect to the front cowl 24 when the windshield panel 26 is unfastened from the front cowl 24. The windshield panel 26 has a generally U-shaped, downwardly protruding and laterally middle lower end portion 34 located at the front end of the concavity 30 in the front cowl 24.

The adjustable front windshield structure 28 according to the present invention further comprises adjust means to permit of adjustment of the vertical position of the front windshield panel 26 with respect to the front cowl 24, viz., to the body structure of the motorcycle 20. In the windshield structure 28 shown in FIG. 3, such adjust means comprises a pair of threaded guide rods 36 and 36' extending upwardly in front of the downwardly protruding lower end portion of the windshield panel 26 and spaced apart in parallel from each other in a lateral direction of the body structure of the motorcycle 20. The threaded guide rods 36 and 36' have upper and lower end portions journaled or otherwise rotatably retained in upper and lower bracket members 38 and 38' positioned within the concavity 30 and fixedly attached to the front cowl 24. The threaded guide rods 36 and 36' are thus held against axial movement with respect to the front cowl 24 and accordingly to the body structure of the motorcycle 20 and are engaged by slide members which are constituted by internally threaded nut members 40 and 40', respectively, movable along the threaded guide rods 36 and 36' with respect to the front cowl 24 as the guide rods 36 and 36' are driven for rotation about the center axes thereof. The nut members 40 and 40' are securely yet detachably attached to the front face of the windshield panel 26 by suitable releasable fastening means such as set screws 42 and 42', respectively. The set screws 42 and 42' are screwed into the bores 44 and 44' in the internally threaded nut members 40 and 40', respectively, preferably through washers which are indicated at 46 and 46', respectively.

Figure 4:
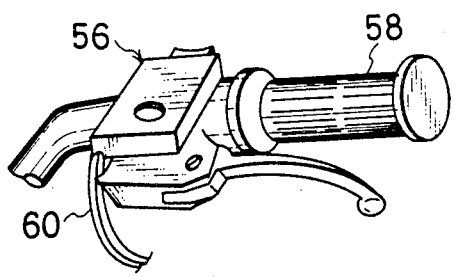
FIG. 4 is a fragmentary perspective view showing a portion of a steering handlebar fitted with a switch unit which forms part of the windshield structure shown in FIG. 3.

The adjust means of the adjustable front windshield structure 28 shown in FIG. 3 further comprises a pair of gear combinations which are associated with the above described threaded guide rods 36 and 36', respectively, and which consist of driving helical gears 48 and 48' and driven helical gears 50 and 50' which are located within the concavity 30 in the front cowl 24. The driven helical gears 50 and 50' are coaxially secured on or integral with upper end portions of the threaded guide rods 36 and 36', respectively, and are held in mesh with the driving helical gears 48 and 48'. The driving helical gears 48 and 48' are shown located at the rear of the driven helical gears 50 and 50', respectively, and are coaxially secured on or integral with drive shafts 52 and 52' projecting from a powered drive unit constituted by, for example, a reversible d.c. motor 54. The drive shafts 52 and 52' have center axes aligned with each other laterally of the body structure of the motorcycle 20 and extending perpendicularly in non-intersecting relationship to the center axes of the threaded guide rods 36 and 36', respectively. The motor 54 is supported on the above mentioned bracket member 38 and has two output shafts respectively coupled to or integral with the drive shafts 52 and 52'. Rotation of the output shafts of the motor 54 is thus transmitted through the drive shafts 52 and 52' to the driving helical gears 48 and 48' and through these helical gears 48 and 48' and the driven helical gears 50 and 50' to the threaded guide rods 36 and 36', respectively. The rotation of the guide rods 36 and 36' about the center axes thereof in turn causes the nut members 40 and 40' to move along the guide rods 36 and 36', respectively, and accordingly the windshield panel 26 to move upwardly or downwardly with respect to the body structure of the motorcycle 20. The combinations of the helical gears 48/50 and 48'/50' are adapted to change the direction of the axis of rotation of the drive shafts 52 and 52' at right angles and to reduce the output speed of the motor 54 for enabling the windshield panel 26 to move upwardly or downwardly at an appropriate fixed speed with respect to the front cowl 24 when the motor 54 is actuated. The motor 54 operates under the control of a manually-operated switch unit located to provide the driver of the motorcycle easy access thereto. In FIG. 4 of the drawings, such a switch unit is indicated at 56 and is shown mounted on a steering handlebar 58 of the motorcycle 20 and electrically connected to the motor 54 by lines 60 through a suitable power source (not shown). The switch unit 56 is of the three-position type having two "on" positions and one "off" position and is operative to actuate the motor 54 for rotation in either direction to drive the windshield panel 26 for upward or downward movement with respect to the front cowl 24.

When the switch unit 56 is manually operated to close in one of the two "on" positions thereof, the reversible d.c. motor 54 is energized with a voltage of a selected polarity so that the output shafts of the motor 54 are driven for rotation in either direction. The rotation of the output shafts of the motor 54 is transmitted through the drive shafts 52 and 52' to the driving helical gears 48 and 48' and through these helical gears 48 and 48' to the driven helical gears 50 and 50' and accordingly to the threaded guide rods 36 and 36', respectively. By the rotation of the guide rods 36 and 36' about the center axes thereof, the nut members 40 and 40' on the guide rods 36 and 36' are caused to move along the guide rods 36 and 36', respectively. The windshield panel 26 is thus caused to move upwardly or downwardly at a fixed speed with respect to the body structure of the motorcycle 20. At a point of time when the windshield panel 26 is moved to a desired height with respect to the body structure of the motorcycle 20, the switch unit 56 is operated to open to bring the motor 54 to a stop.

The embodiment of an adjustable front windshield structure according to the present invention as hereinbefore described may be modified to use a manually-operated drive unit in lieu of the powered drive unit constituted by the reversible d.c. motor 54. FIG. 5 of the drawings shows such a modification of the embodiment shown in FIGS. 3 and 4.

Referring to FIG. 5, the driving helical gears 48 and 48' held in mesh with the driven helical gears 50 and 50' as described with reference to FIG. 3 are axially secured on a common gear shaft 62. The gear shaft 62 extends perpendicularly in non-intersecting relationship to the threaded guide rods 36 and 36' and is rotatably supported on a pair of arms 64 and 64' which form part of the bracket member 38. One of the driving helical gears such as the helical gear 48 as shown is connected through a flexible drive shaft 66 to a manually-operated drive unit 68 located preferably within the reach of a driver seated on the driver's seat 22 (FIG. 2). In FIG. 2, the drive unit 68 is schematically shown mounted on a side wall portion of the fairing or front cowl 24 as indicated by broken lines. Turning back to FIG. 5, the manually-operated drive unit 68 comprises a generally triangular support plate 70 and a combination of driving and driven gears 72 and 74 provided on the inner side of the support plate 70. The driving gear 72 is constituted by, for example, a face gear and is securely mounted on a gear shaft 76 projecting from the support plate 70 and rotatable about the center axis thereof with respect to the support plate 70. The driven gear 74 is constituted by an axially serrated pinion gear securely mounted on a shaft 78 journalled or otherwise rotatably supported on a bracket member 80 secured to the support plate 70. The face gear 72 and the pinion gear 74 are held in mesh with each other and have axes of rotation perpendicular in either intersecting or non-intersecting relationship to each other. The flexible drive shaft 66 is connected at one end thereof to the gear shaft 78 carrying the pinion gear 74 and at the other to the above described driving helical gear 48. The shaft 76 carrying the face gear 72 is securely coupled to and rotatable with a handle 82 provided on the opposite side of the support plate 70 so that the face gear 72 is driven for rotation about the center axis of the gear shaft 76 when the handle 82 is manually turned. The support plate 70 is securely mounted on a side wall portion of the front cowl 24 as above noted by suitable fastening means such as screws (not shown) which are passed through screw holes formed in the support plate 70. In the windshield structure thus constructed and arranged, the driving and driven helical gears 48/48' and 50/50' constitute main driving and driven gears, respectively, and the face gear 72 and the pinion gear 74 constitute auxiliary driving and driven gears, respectively.

When the handle 82 of the drive unit 68 constructed and arranged as above described is manually driven to turn in either direction, the face gear 72 is caused to rotate about the center axis of the gear shaft 76 and drives the pinion gear 74 for rotation about the center axis of the gear shaft 78 The rotation of the pinion gear 72 is transmitted through the flexible drive shaft 66 to the driving helical gear 48 and through the gear shaft 62 to the helical gear 48' and drives the driven helical gears 50 and 50' and accordingly the threaded guide rods 36 and 36'. By the rotation of the threaded guide rods 36 and 36' about the center axes thereof, the nut members 40 and 40' on the guide rods 36 and 36' are caused to move along the guide rods 36 and 36', respectively. The windshield panel 26 is thus caused to move upwardly or downwardly with respect to the body structure of the motorcycle 20 at a speed which is proportional to the speed at which the handle 82 is manually turned. The windshield panel 26 is in this manner adjusted to a desired height with respect to the body structure of the motorcycle 20 (FIGS. 1 and 2) when the handle 82 is released from a manual driving effort.

While the manually-operated drive unit 68 is composed of the combination of the face gear 72 and the pinion gear 74 in the windshield structure 28 described above, a combination of any other forms of gears may be used in the manually-operated drive unit of an adjustable front windshield structure of the type shown in FIG. 5. FIG. 6 of the drawings shows such a modification of the manually-operated drive unit 68.

Referring to FIG. 6, the manually-operated drive unit, designated in its entirety by 68', comprises a generally triangular support plate 70' and a combination of driving and driven spur gears 72' and 74' provided on the inner side of the support plate 70'. The driving spur gear 72' is securely mounted on a gear shaft 76' projecting from the support plate 70' and rotatable about the center axis thereof with respect to the support plate 70'. The driven spur gear 74' is held in mesh with the driving spur gear 72' and is securely mounted on a gear shaft 78' projecting from the support plate 70' in parallel with the gear shaft 76' carrying the driving spur gear 72'. The shaft 78' carrying the driven spur gear 74' is thus rotatable about the center axis thereof with respect to the support plate 70. The flexible drive shaft 66 is connected at one end thereof to the gear shaft 78' carrying the driven spur gear 74' and at the other to a helical gear which is equivalent to the driving helical gear 48' shown in FIG. 5. The shaft 76' carrying the driving spur gear 72' is securely coupled to and rotatable with a handle 82' provided on the opposite side of the support plate 70'. The driving and driven spur gears 72' and 74' are thus driven for rotation about the center axes of the parallel gear shafts 76' and 78' when the handle 82' is manually turned. The support plate 70' is securely mounted on a side wall portion of the front cowl 24 shown in FIGS. 2 and 3 by suitable fastening means such as screws (not shown) which are passed through screw holes formed in the support plate 70' similarly to the support plate 70 of the arrangement shown in FIG. 5. When the handle 82' is manually driven to turn in either direction, the driving spur gear 72' is caused to rotate about the center axis of the gear shaft 76' and drives the driven spur gear 74' for rotation about the center axis of the gear shaft 78'. The rotation of the driven spur gear 72' is transmitted through the flexible drive shaft 66 to the driving helical gears 48 and 48' and drives the driven helical gears 50 and 50' and accordingly the threaded guide rods 36 and 36' as described with reference to FIG. 5.

Figure 7:
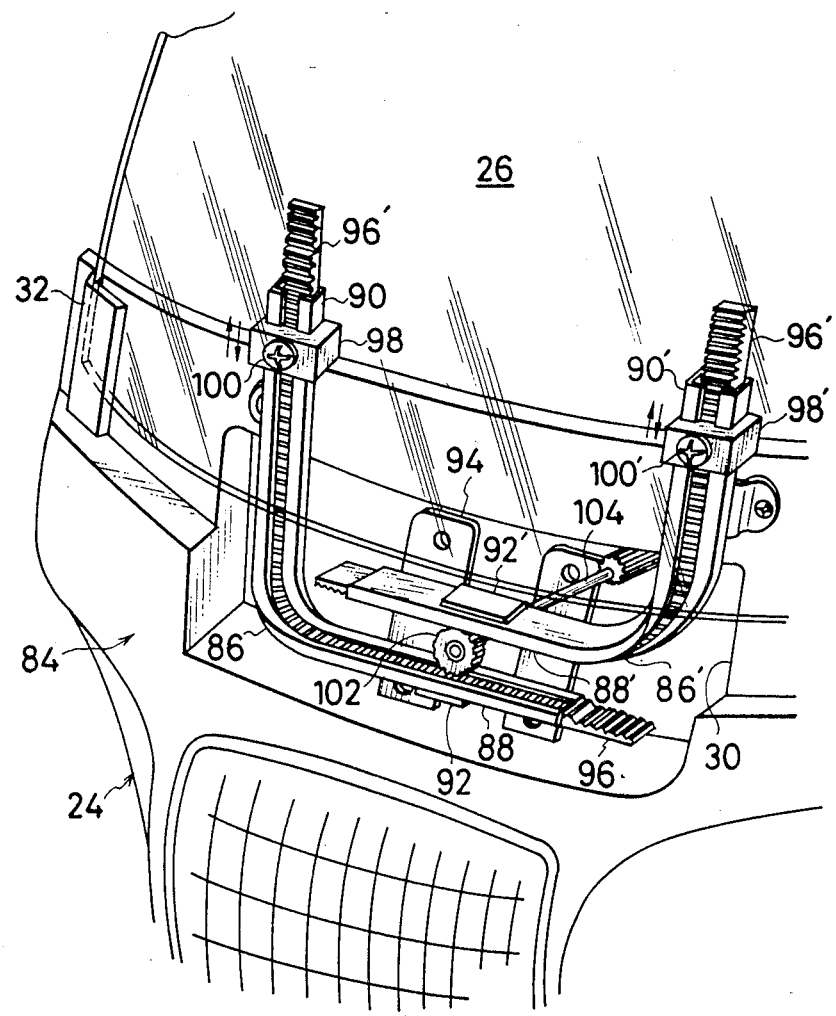
FIG. 7 is a view also similar to FIG. 3 but shows a third preferred embodiment of an adjustable windshield support structure according to the present invention as also applied to the two-wheel motorcycle illustrated in FIGS. 1 and 2.

FIG. 7 of the drawings shows a third preferred embodiment of an adjustable front windshield structure according to the present invention. The windshield structure, now designated in its entirety by reference numeral 84, comprises a laterally middle upper end portion of the front cowl 24 formed with a generally rectangular concavity 30 similarly to the windshield structure 28 described with reference to FIG. 3. Also similarly to the windshield structure 28 of FIG. 3, the adjustable front windshield structure 84 further comprises a pair of guide members 32 attached to or integral with a front wall portion of the front cowl 24 and spaced apart from each other laterally of the front cowl 24 although only one of such members is seen in FIG. 7. The guide members 32 on the front cowl 24 extend vertically along opposite side edge portions, respectively, of the windshield panel 26 and form vertical grooves which are open upwardly and further toward each other laterally of the front cowl 24. The opposite side edge portions of the windshield panel 26 are slidably received in these grooves to permit the windshield panel 26 to move upwardly or downwardly with respect to the front cowl 24 when the windshield panel 26 is unfastened from the front cowl 24. The windshield panel 26 has a lower end portion partially located at the front end of the concavity 30 in the cowl 24.

The adjustable front windshield structure 84 shown in FIG. 7 further comprises adjust means to permit of adjustment of the vertical position of the front windshield panel 26 with respect to the front cowl 24, viz., to the body structure of the motorcycle 20 shown in FIGS. 1 and 2. The adjust means comprises a pair of generally L-shaped guide channels 86 and 86' each of which is located in part in front of a lower end portion of the windshield panel 26 and in part in front of the concavity 30 in the front cowl 24. Each of the guide channels 86 and 86' has a generally C-shaped cross section and is formed with a groove extending longitudinally throughout the length of the guide channel as shown. One guide channel 86 consists of a horizontal lower portion 88 extending in front of the concavity 30 and a vertical upper portion 90 merging upwardly out of the horizontal lower portion 88 and extending in its major proportion in front of the windshield panel 26. The horizontal lower portion 88 and the vertical upper portion 90 are thus bent at right angles from each other and are wrung in such a manner that the longitudinal groove in the guide channel 86 is open upwardly in the horizontal lower portion 88 and forwardly of the motorcycle 20 (FIGS. 1 and 2) in the vertical upper portion 90 of the guide channel 86. The guide channel 86 thus shaped is secured to the front cowl 24 by means of a lower lug portion 92 of a bracket member 94 fixedly attached to the front cowl 24. Likewise, the other guide channel 86' consists of a horizontal lower portion 88' extending in front of the concavity 30 and a vertical upper portion 90' merging upwardly out of the horizontal lower portion 88' and extending in its major proportion in front of the windshield panel 26. The horizontal lower portion 88' and the vertical upper portion 90' of the guide channel 86' are thus also bent at right angles from each other and are wrung in such a manner that the longitudinal groove in the guide channel 86' is open downwardly in the horizontal lower portion 88' and forwardly of the motorcycle 20 (FIGS. 1 and 2) in the vertical upper portion 90' of the guide channel 86'. The guide channel 86' thus shaped is secured to the front cowl 24 by means of an upper lug portion 92' of the above mentioned bracket member 94 fixedly attached to the front cowl 24. The vertical upper portions 90 and 90' of the guide channels 86 and 86' are spaced apart in parallel from each other laterally of the body structure of the motorcycle 20, while the horizontal lower portions 88 and 88' of the guide channel 86 and 86' are vertically spaced apart in parallel from each other in such a manner that the longitudinal grooves in the portions 88 and 88' are vertically open toward each other.

The adjust means of the windshield structure 84 shown in FIG. 7 further comprises elongated flexible rack members 96 and 96' each of which is formed of, for example, a synthetic resin. Each of the rack members 96 and 96' lengthwise extends in part through the horizontal lower portion 88 or 88' and in part through the vertical upper portion 90 or 90' of each of the above described guide channels 86 and 86'. Each rack member 96 or 96' is thus lengthwise slidable in part through the horizontal lower portion 88 or 88' of the guide channel 86 or 86' and in part through the vertical upper portion 90 or 0' of the guide channel 86 or 86', respectively. These rack members 96 and 96' have toothed surfaces exposed from the guide channels 86 and 86' through the longitudinal grooves in the channels 86 and 86', respectively. While each of the rack members 96 and 96' is herein shown formed with teeth throughout the length thereof, only the horizontal lower portion of each rack member may be formed with teeth over a length slightly larger than a maximum desired distance through which the windshield panel 26 is to be moved with respect to the front cowl 24, though not shown in the drawings.

The guide channels 86 and 86' arranged as described above have fitted thereon slide members 98 and 98' which are lengthwise slidable on the vertical upper portions 90 and 90' of the guide channels 86 and 86', respectively. The slide members 98 and 98' are movable with the rack members 96 and 96' along the guide channels 86 and 86', respectively, and are securely yet detachably attached to the front face of the windshield panel 26 by suitable releasable fastening means such as set screws 100 and 100', respectively. The windshield panel 26 is thus movable upwardly and downwardly with respect to the front cowl 24 when the rack members 96 and 96' are driven to lengthwise slide in either direction through the guide channels 86 and 86', respectively. In order that the slide members 98 and 98' be movable with the rack members 96 and 96' along the guide channels 86 and 86' as above mentioned, each of the slide members 98 and 98' may be secured to each of the rack members 96 and 96' by suitable fastening means such as a screw or may be formed with teeth which are held in mating engagement with some of the teeth of each rack member, though not shown in the drawings.

The adjust means of the windshield structure 84 shown in FIG. 7 further comprises a pinion gear 102 which is located between the respective horizontal lower portions 88 and 88' of the guide channels 86 and 86' and which is held in mesh with both of the rack members 96 and 96' in the guide channels 86 and 86'. The pinion gear 102 has an axis of rotation parallel with the teeth of the rack members 96 and 96' and is securely carried on a gear shaft 104 extending in alignment with the axis of rotation of the pinion gear 102. Though not shown, the gear shaft 104 is connected to or engaged by a suitable powered drive unit constituted by, for example, a reversible d.c. motor as in the embodiment shown in FIG. 3 or a manually-operated drive unit as in the embodiment shown in FIG. 5 or 6.

When the drive shaft 104 thus coupled to or engaged by the drive unit is driven for rotation in either direction about the center axis thereof by means of the powered or manually-operated drive unit, the pinion gear 102 is caused to rotate on the teeth of the rack members 96 and 96' in the horizontal lower portions 88 and 88' of the guide channels 86 and 86'. The rack members 96 and 96' are thus driven to lengthwise slide in opposite directions through the horizontal lower portions 88 and 88' of the guide channels 86 and 86' and in the same directions through the vertical upper portions 90 and 90' of the guide channels 86 and 86'. Such movements of the rack members 96 and 96' are transmitted through the slide members 98 and 98' to the windshield panel 26, which is accordingly caused to move upwardly or downwardly with respect to the front cowl 24. The windshield panel 26 is in this manner adjusted to a desired height with respect to the body structure of the motorcycle 20 (FIGS. 1 and 2) when the drive unit is brought to a stop.

The adjustable front windshield structure 28 or 84 of each of the embodiments hereinbefore described is preferably housed within a suitable decorative and/or protective enclosure or housing as indicated schematically at 106 in FIG. 2.

Figure 8:
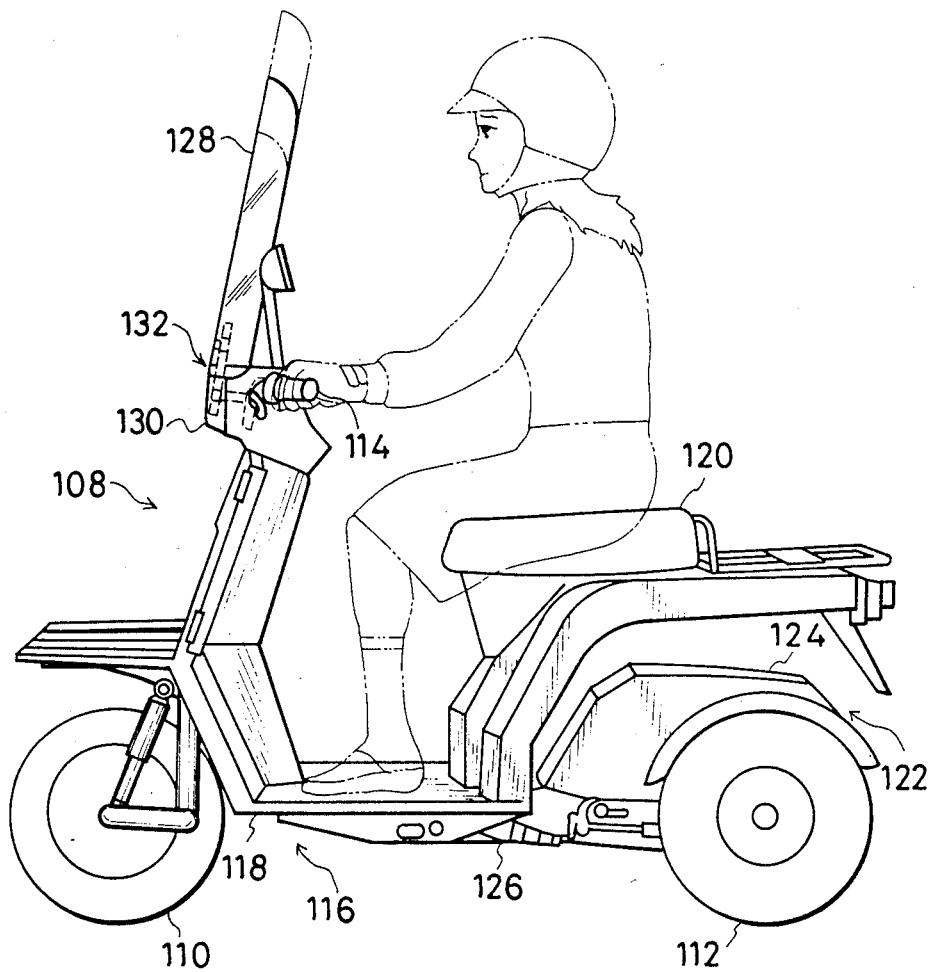
FIG. 8 is a side elevation view showing a three-wheel motor scooter into which an adjustable front windshield structure according to the present invention may be incorporated.

While it has been described that each of the embodiments of the present invention is provided in the two-wheel motorcycle 20 shown in FIGS. 1 and 2, an adjustable front windshield structure according to the present invention may be used in a two-wheel or three-wheel motor scooter or in an automotive vehicle of the open-top type. FIG. 8 of the drawings shows an example of a three-wheel motor scooter to which an adjustable front windshield structure according to the present invention is thus applicable.

As shown in FIG. 8, the three-wheel motor scooter, generally designated by reference numeral 108, includes a front road wheel 110, a pair of rear road wheel 112 (only one of which is seen), a pair of steering handlebars 114 and 114' (FIGS. 9, 10 and 11), a front body structure 116 including a stepping floor 118 and a driver's seat 120, a rear body structure 122 including a power unit 124, and a swing joint structure 126 interconnecting the front and rear body structures 116 and 122. A front windshield panel 128 extends upwardly from a front structural member 130 which forms part of the front body structure 116 of the motor scooter 108 and which is located in front of the driver's seat 120. The construction of a motor scooter of the type herein shown being per se well known in the art and being rather immaterial to the understanding of the gist of the present invention, description regarding further details of the construction of the motor scooter 108 will not be herein incorporated.

In accordance with the present invention, the front windshield panel 128 and the front structural member 130 having the windshield panel 26 mounted thereon forms part of an adjustable front windshield structure which is indicated generally at 132 in FIG. 8. As illustrated to an enlarged scale in FIG. 9 of the drawings, the adjustable front windshield structure 132 further comprises a pair of support members 134 and 134' securely mounted on the steering handlebars 114 and 114', respectively. Each of the support members 134 and 134' consists of a cylindrical front sleeve portion securely received on each of the handlebars 114, an intermediate strip portion extending forwardly from the front sleeve portion and a cylindrical rear sleeve portion formed at the foremost end of the strip portion. The support members 134 and 134' are adapted to support adjust means to permit of adjustment of the vertical position of the front windshield panel 128 with respect to the front structural member 130, viz., to the body structure of the motor scooter 108 shown in FIG. 8.

The adjust means thus supported by the support members 134 and 134' comprises a pair of generally L-shaped guide pipes 136 and 136' which are located in front of the steeing handlebars 114 and 114', respectively. One guide pipe 136 consists of a horizontal lower portion 138 extending in front of a horizontal inner end portion of one of the handlebars 114 and a vertical upper portion 140 merging upwardly out of the horizontal lower portion 138 and extending in its major proportion behind the windshield panel 128. The horizontal lower portion 138 and the vertical upper portion 140 of the guide pipe 136 are thus bent at right angles from each other. The horizontal lower portion 138 of the pipe 136 is formed with a slot 142 elongated longitudinally of the portion 138 and, similarly, the vertical upper portion 140 of the pipe 136 is formed with a slot 144 elongated longitudinally of the portion 138. The slot 142 in the horizontal lower portion 138 is open forwardly and the slot 144 in the vertical upper portion 140 is open forwardly of the body structure of the motor scooter 108. Likewise, the other guide pipe 136' consists of a horizontal lower portion 138' extending in front of a horizontal inner end portion of the other handlebar 114' and a vertical upper portion 140' merging upwardly out of the horizontal lower portion 138' and extending in its major proportion in front of the windshield panel 128. The horizontal lower portion 138' and the vertical upper portion 140' of the guide pipe 136' are thus also bent at right angles from each other. The horizontal lower portion 138' of the pipe 136' is formed with a slot 142' elongated longitudinally of the portion 138' and, similarly, the vertical upper portion 140' of the pipe 136' is formed with a slot 144' elongated longitudinally of the portion 138'. The slot 142' in the horizontal lower portion 138' is open rearwardly and the slot 144' in the vertical upper portion 140 is open forwardly of the body structure of the motor scooter 108 (FIG. 8). The vertical upper portions 140 and 140' of the guide pipes 136 and 136' are spaced apart in parallel from each other laterally of the body structure of the motor scooter 108, while the horizontal lower portions 138 and 138' of the guide pipes 136 and 136' are spaced apart in parallel from each other in a fore-and-aft direction of the motor scooter 108. The slots 142 and 142' in the horizontal lower portions 138 and 138' of the guide pipes 136 and 136' are thus confronted by each other. The lower portions 138 and 138' of the guide pipes 136 and 136' are securely connected together by means of a pair of bracket members 146 and 146' which are spaced apart from each other laterally of the body structure of the motor scooter 108.

Figure 9:
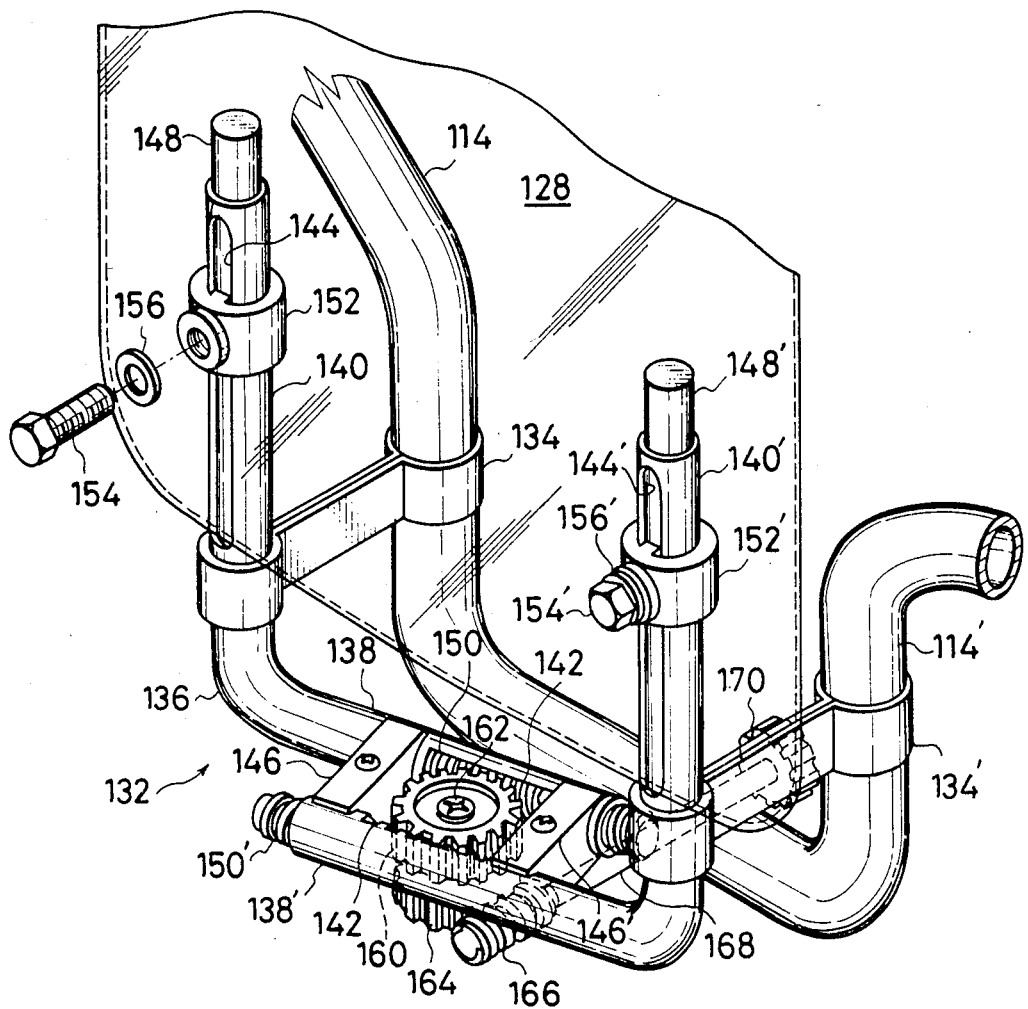
FIG. 9 is a fragmentary perspective view showing, also to an enlarged scale, a fourth preferred embodiment of an adjustable front windshield structure according to the present invention as applied to the three-wheel motor scooter illustrated in FIG. 8.

The adjust means of the adjustable front windshield structure shown in FIG. 9 further comprises elongated flexible members 148 and 148' each formed of, for example, a synthetic resin. Each of these elongated flexible members 148 and 148' extends in and along the horizontal lower portion 138 or 138' and vertical upper portion 140 or 140' of each of the guide pipes 136 and 136' and is lengthwise slidable in part through the horizontal lower portion 138 or 138' and in part through the vertical upper portion 140 or 140'. The elongated flexible members 148 and 148' have helically threaded rack portions 150 and 150' slidable in the horizontal lower portions 138 and 138' of the guide pipes 136 and 136', respectively. These threaded rack portions 150 and 150' of the elongated flexible members 148 and 148' are partially exposed toward each other through the slots 142 and 142' in the horizontal lower portions 138 and 138' of the guide pipes 136 and 136', respectively. While helical threads are formed only on those portions of the elongated flexible members 148 and 148' which are slidable in the horizontal lower portion 138 or 138' of the guide pipes 136 and 136' in the embodiment herein shown, such threads may if desired be formed on the elongated flexible members 148 and 148' throughout the length of the elongated flexible members 148 and 148', though not shown in the drawings. In lieu of the helical threads thus formed on the elongated flexible members 148 and 148', semi-circumferential grooves may be formed in those portions of the elongated flexible members 148 and 148' slidable in the lower portions 138 and 138' of the guide pipes 136 and 136', respectively.

The guide pipes 136 and 136' arranged as described above have fitted thereon generally cylindrical slide members 152 and 152' which are lengthwise slidable on the vertical upper portions 140 and 140' of the guide pipes 136 and 136', respectively. The slide members 152 and 152' are movable with the elongated flexible members 148 and 148' along the guide pipes 136 and 136', respectively, and are securely yet detachably attached to the front face of the windshield panel 128 by suitable releasable fastening means such as set screws or bolts 154 and 154' and washers 156 and 156', respectively. The set screws or bolts 154 and 154' reach the windshield panel 128 through the slots 144 and 144' in the guide pipes 136 and 136' and through the vertical upper portions of the elongated flexible members 148 and 148', respectively. The windshield panel 128 is thus movable upwardly and downwardly with respect to the front cowl 24 when the elongated flexible members 148 and 148' are driven to lengthwise slide in either direction through the guide pipes 136 and 136', respectively. In order that the slide members 152 and 152' be prevented from being removed from the guide pipes 136 and 136', the slide members 152 and 152' are formed with lug portions 158 and 158', respectively, radially projecting radially from the cylindrical wall portions of the slide members 152 and 152' and movable through the slots 144 and 144' in the guide pipes 136 and 136', respectively.

The adjust means of the windshield structure 132 shown in FIG. 7 further comprises a pinion gear 160 which is located between the respective horizontal lower portions 138 and 138' of the guide pipes 136 and 136' and which is held in mesh with the rack portions 150 and 150' of both of the elongated flexible members 148 and 148' in the guide pipes 136 and 136'. The pinion gear 160 is securely carried on a gear shaft 162 having a vertical axis of rotation perpendicular in non-intersecting relationship to the directions of elongation of the rack portions 150 and 150' of the elongated flexible members 148 and 148' in the horizontal lower portions 138 and 138' of the guide pipes 136 and 136'. The gear shaft 162 has further securely carried thereon a worm gear 164 which is held in mesh with a worm 166 rotatable about an axis perpendicular in non-intersecting relationship to the center axis of the gear shaft 162. The worm 166 in turn is securely carried on an elongated gear shaft 168 which extends rearwardly from the worm 166 and which has a drive gear 170 securely carried at its end opposite to the worm 166. The drive gear 170 forms part of a suitable manually-operated drive unit similar to the drive unit included in the embodiment of FIG. 5 or the drive unit shown in FIG. 6.

When the drive gear 170 is driven for rotation in either direction about the center axis thereof by means of the manually-operated drive unit, the worm 166 is caused to rotate with the drive gear 170 and drive shaft 168. The rotation of the worm 166 is transmitted at right angles to the pinion gear 164 and drives the pinion gear 160 for rotation about the center axis of the gear shaft 162. The pinion gear 164 is thus caused to rotate on the helical threads of the rack portions 150 and 150' if the elongated flexible members 148 and 148' in the horizontal lower portions 138 and 138' of the guide pipes 136 and 136'. The elongated flexible members 148 and 148' are thus driven to lengthwise slide in opposite directions through the horizontal lower portions 138 and 138' of the guide pipes 136 and 136' and in the same directions through the vertical upprr portions 140 and 140' of the guide pipes 136 and 136'. Such movements of the elongated flexible members 148 and 148' are transmitted through the slide members 152 and 152' to the windshield panel 128, which is accordingly caused to move upwardly or downwardly with respect to the front structural member 130. The windshield panel 128 is in this manner adjusted to a desired height with respect to the body structure of the motor scooter 108 (FIG. 8) when the drive unit is brought to a stop.

Figure 10:
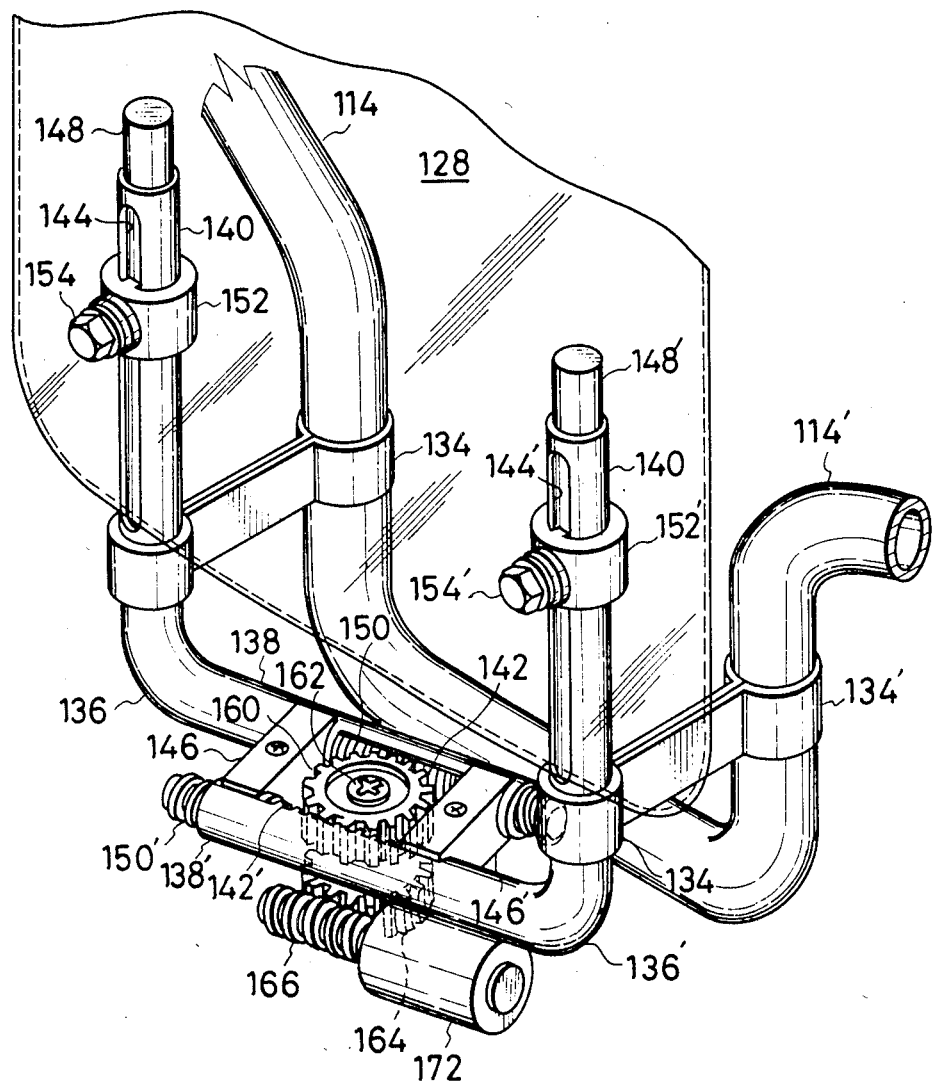
FIG. 10 is a view similar to FIG. 9 but shows a fifth preferred embodiment of an adjustable front windshield structure according to the present invention as applied to the three-wheel motor scooter illustrated in FIG. 8, the embodiment being a modification of the windshield structure shown in FIG. 9.

While the adjust means of the adjustable front windshield structure hereinbefore described with reference to FIG. 9 is adapted to be driven by a manually-operated drive unit, such adjust means may be driven by a suitable powered drive unit such as a reversible d.c. motor as in the embodiment of FIG. 3. An embodiment of an adjustable front windshield structure incorporating such adjust means is illustrated in FIG. 10 of the drawings. In the adjust means of the windshield structure shown in FIG. 10, the worm 166 held in mesh with the worm gear 64 as in the embodiment of FIG. 9 is coupled directly to the output shaft of a reversible d.c. motor 172. Though not shown in FIG. 10, the motor 172 is electrically connected to a suitable power source through a manually-operated switch unit so that the windshield panel 128 is driven to move upwardly or downwardly with respect to the body structure of the motor scooter 108 (FIG. 8) when the switch unit is actuated to energize the motor 172 with a voltage of a selected polarity. The motor 172 may be mounted on the front structural member 130 or any other member forming part of the body structure of the motor scooter 108.

Figure 11:
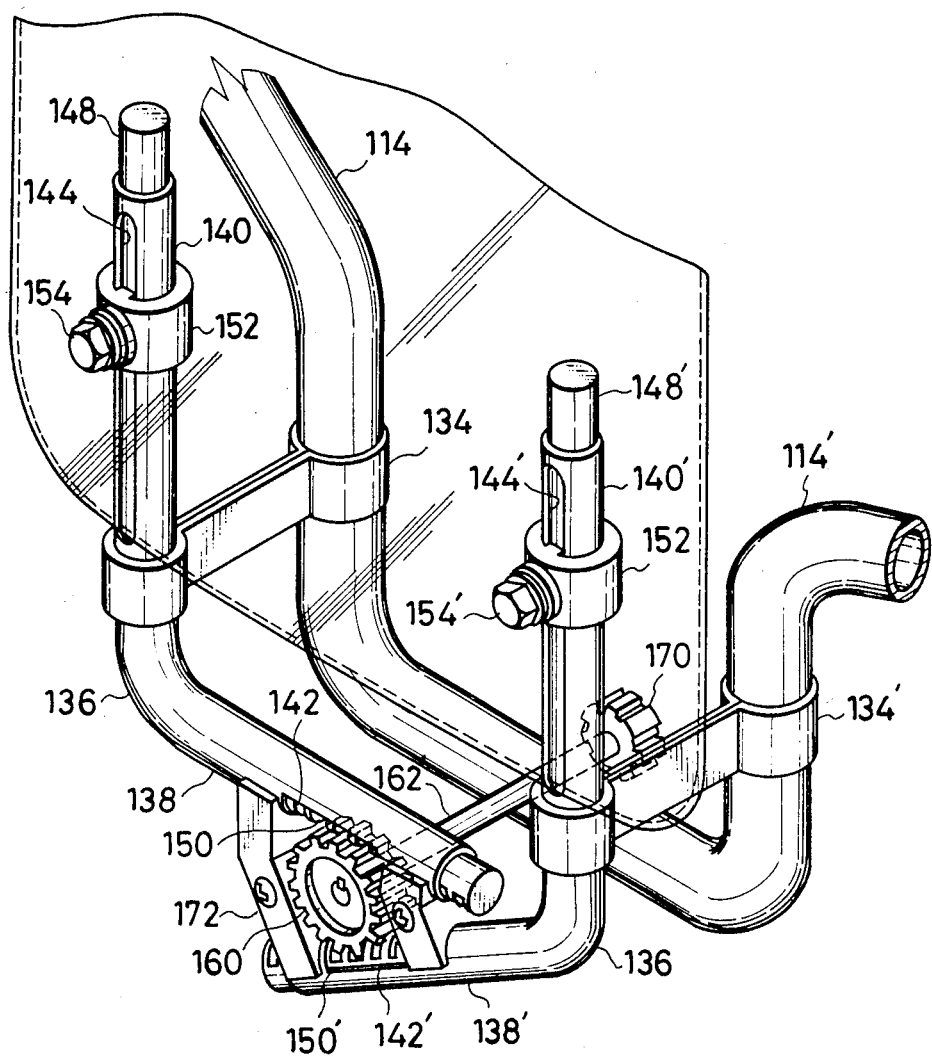
Fig. 11 is a view also similar to FIG. 9 but shows a sixth preferred embodiment of an adjustable front windshield structure according to the present invention as applied to the three-wheel motor scooter illustrated in FIG. 8, the embodiment being another modification of the windshield structure shown in FIG. 9.

While, furthermore, the lower portions 138 and 138' of the guide pipes 136 and 136' in the adjustable front windshield structure described with reference to FIG. 9 are spaced apart in parallel from each other in a fore-and-aft direction of the motor scooter 108, these portions of the guide pipes 136 and 136' may be arranged otherwise where, for example, it is desired to lessen the space requirements of the vehicle. In FIG. 11 of the drawings, the lower portions 138 and 138' of the guide pipes 136 and 136' which forms part of the adjust means in an adjustable front windshield structure essentially similar to the windshield structure described with reference to FIG. 9 are shown spaced apart vertically from each other. The lower portion 138 of one guide pipe 136 is bent horizontally from the vertical upper portion 140 of the pipe 136 and has the elongated slot 142 in its lower wall portion, and the lower portion 138' of the other guide pipe 136' is inclined downwardly from the vertical upper portion 140' of the pipe 136' and has the elongated slot 142' in its upper wall portion. The lower portions 138 and 138' of the guide pipes 136 and 136' thus arranged are coupled together by means of a bracket member 174. The pinion gear 160 in mesh with the rack portions 150 and 150' of the elongated flexible members 148 and 148' slidable in the guide pipes 136 and 136' thus arranged is located between these lower portions 138 and 138' of the pipes 136 and 136' and is securely carried on a gear shaft 162' having a horizontal axis of rotation in a fore-and-aft direction of the motor scooter 108 although the axis of rotation is, also in this embodiment, perpendicular in non-intersecting relationship to the directions of elongation of the lower portions 138 and 138' of the guide pipes 136 and 136'. The gear shaft 162' is directly connected at its end opposite to the pinion gear 160 to the drive gear 170 forming part of a manually-operated drive unit.

Figure 12:
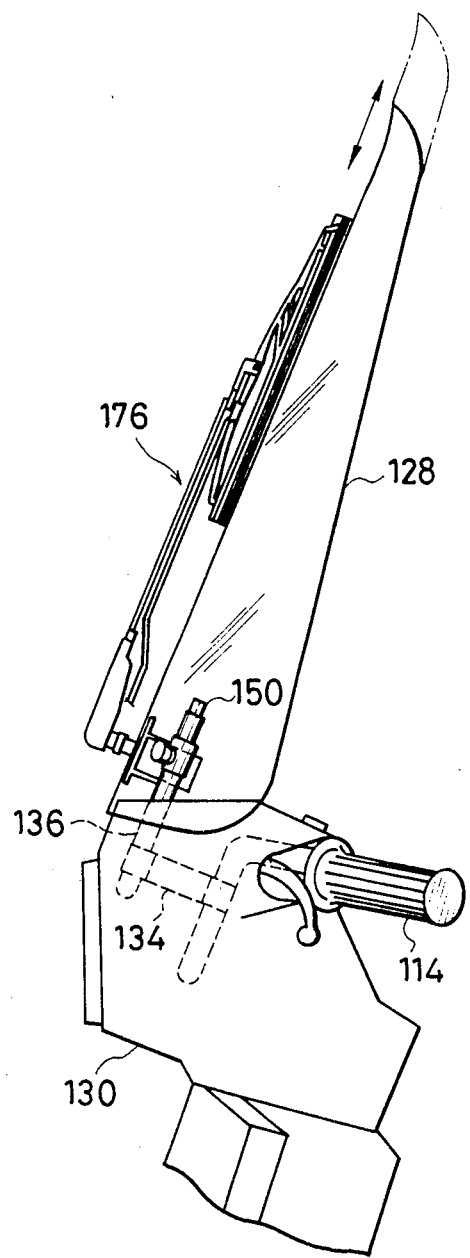
FIG. 12 is a side elevation view of a seventh preferred embodiment of an adjustable front windshield structure according to the present invention as applied to the three-wheel motor scooter illustrated in FIG. 8, the embodiment being adapted for use on an open-top vehicle having a wiper assembly on the front windshield.

Each of the embodiments of the adjustable front windshield structure as hereinbefore described with reference to FIGS. 9 to 11 is applicable not only to a two-wheel or three-wheel motor scooter but also to a motorcycle. Furthermore, such an embodiment may be applied to a motorcycle or a motor scooter of the type having a windshield wiper assembly on the front windshield panel. FIG. 12 of the drawings schematically shows an embodiment in which the adjustable front windshield structure of, for example, the construction shown in FIG. 9 is applied to a motor scooter having a windshield wiper assembly 176 on the front windshield panel 128. In this instance, the wiper assembly 176 is moved together with the windshield panel 128 with respect to the body structure of the motor scooter so that the driver of the motor scooter is allowed to have a clear front view through the windshield panel 128 during rainfall.

What is claimed is:

1. An adjustable front windshield structure for an open-top vehicle, comprising a front structural member which forms part of the body structure of the open-top vehicle, a front windshield panel upstanding from said front structural member and vertically movable with respect to the front structural member, guide means to guide the vertical movement of the windshield panel with respect to the front structural member, a pair of guide members fast on the front structural member and each having a vertically extending portion, slide members respectively engaging said guide members and each movable at least in part along the vertically extending portion of each of the guide members, drive means operative to drive said slide member for movement along said guide members, respectively, and fastening means securely connecting said slide members to said windshield panel so that the windshield panel is movable with the slide members along the respective vertically extending portions of the guide members, said guide members being constituted by a pair of generally vertical threaded guide rods secured to said front structural member and spaced apart substantially in parallel from each other laterally of the body structure of the vehicle and each rotatable about the center axis thereof with respect to the front structural member, said slide member being constituted by a pair of internally threaded nut members threadedly engaging said threaded guide rods, respectively, and operative to move on and along the threaded guide rods as the guide rods are caused to turn about the respective center axes thereof, said drive means being operative to drive said threaded guide rods for rotation about the respective center axes of the guide rods with respect to said front structural member, said drive means comprising a pair of drive gears coaxially rotatable with said threaded guide rods, respectively, and a pair of driving gears in mesh with the drive gears and rotatable about axes substantially aligned with each other, each of said driving and driven gears being constituted by a helical gear and the driving helical gears being securely carried on a common drive shaft which is rotatable about an axis substantially perpendicular in non-intersecting relationship to the axes of rotation of the driven helical gears, a flexible drive member being connected to said common drive shaft.

2. An adjustable front windshield as set as set forth in claim 1, in which said drive means further comprises a powered drive unit having an output shaft operatively connected to said driving gears.

3. An adjustable front windshield structure as forth in claim 1, in which said drive means further comprises a manually-operated drive unit having an output member operatively connected to said driving gears.

4. An adjustable front windshield structure as set forth in claim 6, in which said driving and driven gears constitute main driving and driven gears and in which said manually-operated drive unit comprises auxiliary driving and driven gears held in mesh with each other and rotatable about axes fixed with respect to said front structural member, a manually driven member to transmit a manual turning effort to the auxiliary driving gear, said output member being constituted by the auxiliary driven gear.

5. An adjustable front windshield structure as set forth in claim 4, in which said drive means further comprises said elongated flexible drive member anchored at one end to said auxiliary driven gear and at the other to said main driving gears.

6. An adjustable front windshield structure as set forth in claim 4, in which said auxiliary driving gear is constituted by a face gear and said auxiliary driven gear is constituted by an axially serrated pinion gear.

7. An adjustable front windshield structure as set forth in claim 4, in which each of said auxiliary driving and driven gears is constituted by a spur gear.

8. An adjustable front windshield structure for an open-top vehicle, comprising
a front structural member which forms part of the body structure of the open-top vehicle,
a front windshield panel upstanding from said front structural member and vertically movable with respect to the front structural member,
guide means to guide the vertical movement of the windshield panel with respect to the front structural member,
a pair of guide members fast on the front structural member and each having a vertically extending portion,
slide members respectively engaging said guide members and each movable at least in part along the vertically extending portion of each of the guide members,
drive means operative to drive said slide members for movement along said guide members, respectively, and
fastening means securely connecting said slide members to said windshield panel so that the windshield panel is movable with the slide members along the respective vertically extending portions of the guide members,
wherein said guide members comprise guide channels each of which has a lower portion and an upper portion merging upwardly out of the lower portion and which is formed with a longitudinal groove extending in part in the lower portion and in part in the upper portion, the respective lower portions of the guide channels being spaced apart from each other and the respective longitudinal grooves in the lower portions being open toward each other, said drive means comprising a pair of flexible elongated members lengthwise slidable in part through the lower portions and in part through the upper portions of the guide channels, respectively, and having toothed rack portions slidable in said lower portions of the guide channels, respectively, the respective rack portions in the lower portions of the guide channels being exposed to each other through the grooves in the lower portion, said slide members being secured to said flexible elongated members, respectively, and movable on and along the upper portions of the guide channels, respectively, and a pinion gear held in mesh with the rack portions of said elongated members.

9. An adjustable front windshield structure as set forth in claim 8, in which the upper portions of said guide channels are spaced apart substantially in parallel from each other laterally of the body structure of the vehicle and in which the lower portions of the guide channel are vertically spaced apart in parallel from each other.

10. An adjustable front windshield structure as set forth in claim 9, in which said the lower and upper portions of each of said guide channels are bent substantially at right angles from each other and are wrung in such a manner that the respective longitudinal grooves in the lower portions of the guide chnnels are open vertically toward each other.

11. An adjustable front windshield structure for an open-top vehicle, comprising
a front structural member which forms part of the body structure of the open-top vehicle,
a front windshield panel upstanding from said front structural member and vertically movable with respect to the front structural member,
guide means to guide the vertical movement of the windshield panel with respect to the front structural member,
a pair of guide members fast on the front structural member and each having a vertically extending portion,
slide members respectively engaging said guide members and each movable at least in part along the vertically extending portion of each of the guide members,
drive means operative to drive said slide members for movement along said guide members, respectively, and
fastening means securely connecting said slide members to said windshield panel so that the windshield panel is movable with the slide members along the respective vertically extending portions of the guide members,
wherein said guide members comprise guide pipes each of which has a lower portion and an upper portion merging upwardly out of the lower portion and which is formed with a longitudinal slot extending in the lower portion, the respective lower portions of the guide pipes being spaced apart from each other and the respective longitudinal slots in the lower portions being open toward each other, said drive means comprising a pair of flexible elongated members lengthwise slidable in part through the lower portions and in part through the upper portions of the guide pipes, respectively, and having toothed or threaded rack portions slidable in said lower portions of the guide pipes, respectively, the respective rack portions in the lower portions of the guide pipes being exposed to each other through the slots in the lower portions, said slide members being secured to said flexible elongated members, respectively, and movable on and along the upper portions of the guide pipes, respectively, and a pinion gear held in mesh with the rack portions of said elongated members.

12. An adjustable front windshield structure as set forth in claim 11, in which the upper portions of said guide pipes are spaced apart substantially in parallel from each other laterally of the body structure of the vehicle and in which the lower portions of the guide pipe are spaced apart in parallel from each other in a fore-and-aft direction of the vehicle.

13. An adjustable front windshield structure as set forth in claim 12, in which said the lower and upper portions of each of said guide pipes are bent substantially at right angles from each other.

14. An adjustable front windshield structure as set forth in claim 12, in which said drive means further comprises a worm gear rotatable with said pinion gear, a worm held in mesh with the worm gear and rotatable about an axis substantially perpendicular in non-intersecting relationship to the worm gear, and a powered drive unit operatively connected to the worm.

15. An adjustable front windshield structure as set forth in claim 11, in which the upper portions of said guide pipes are spaced apart substantially in parallel from each other laterally of the body structure of the vehicle and in which the lower portions of the guide pipe are vertically spaced apart in parallel from each other.

16. An adjustable front windshield structure as set forth in claim 11, in which the upper portions of said guide pipes are spaced apart substantially in parallel from each other laterally of the body structure of the vehicle and in which the lower portion of one of the guide pipes is vertically inclined with respect to the lower portion of the other guide pipe.

17. An adjustable front windshield structure as set forth in claim 12, in which said the lower and upper portions of each of said guide pipes are bent substantially at right angles from each other.

18. An adjustable front windshield structure as set forth in claim 1, in which said front windshield panel forms part of a vehicle body structure including a headlight located in front of and fitted to said front structural member and is positioned above said headlight, and wherein said guide members and said slide members are located above and in the vicinity of said headlight.

* * * * *